United States Patent [19]

Ely

[11] 4,159,436

[45] Jun. 26, 1979

[54] ELECTRON BEAM FOCUSSING FOR X-RAY APPARATUS

[75] Inventor: Raymond V. Ely, Abingdon, England

[73] Assignee: Thor Cryogenics Limited, England

[21] Appl. No.: 869,414

[22] Filed: Jan. 16, 1978

[30] Foreign Application Priority Data

Jan. 19, 1977 [GB] United Kingdom ................ 2181/77

[51] Int. Cl.$^2$ ................................................ H02K 9/08

[52] U.S. Cl. ........................................ 313/57; 250/398

[58] Field of Search ........... 250/396 R, 398, 396 ML, 250/492, 399; 313/55, 57, 60, 361, 432, 433

[56] References Cited

U.S. PATENT DOCUMENTS

| | | | |
|---|---|---|---|
| 1,246,066 | 11/1917 | Dempster | 313/57 |
| 1,598,150 | 8/1926 | Mulvany et al. | 313/57 |
| 2,651,727 | 9/1953 | Ehrenberg et al. | 313/60 |
| 2,866,113 | 12/1958 | Cosslett | 313/57 |
| 2,877,353 | 3/1959 | Newberry | 313/57 |

*Primary Examiner*—Bruce C. Anderson
*Attorney, Agent, or Firm*—Beveridge, De Grandi, Kline & Lunsford

[57] ABSTRACT

In X-ray apparatus having an electron beam gun producing a beam of electrons to be focussed on an X-ray producing target, in addition to a first focussing electrode on the gun structure, there is provided an auxiliary focussing means, comprising an electrostatic focussing electrode or electrodes or an electro-magnetic focussing coil or coils separately mounted to be adjustable in position in three orthogonal directions.

8 Claims, 3 Drawing Figures

ELECTRON BEAM FOCUSSING FOR X-RAY APPARATUS

BACKGROUND OF THE INVENTION

1. Field of the Invention

This invention relates to electron beam focussing in X-ray apparatus.

The invention is applicable for example to X-ray apparatus requiring a point source of X-rays. Focussing of an electron beam is required in for example, X-ray microscopes, employing a point focus X-ray projection technique; an electron beam from a gun in such apparatus is focussed onto a target of a suitable metal to emit X-rays. For microscopy, it is essential that the electron beam must be sharply focussed to give a substantially point source of the X-rays. With point focus projection techniques, by disposing a specimen to be examined between the point source of X-rays and a fluorescent viewing screen or other viewing device or photographic emulsion, magnification is obtained. Further magnification can be obtained by projecting the image onto the input phosphor of an X-ray sensitive camera and viewing a television monitor connected to the camera.

2. Prior Art

It is a well-known practice in X-ray microscopes to employ a sharply bent hairpin filament arranged so that the sharp bend in the filament is the part thereof nearest the target. The electrons are emitted from the tip of such a filament and are partially focussed by a biased grid cylinder between the filament and the target. This grid cylinder is normally cup-shaped and has a diaphragm with a slit or aperture. It has to be accurately positioned with respect to the filament and electrically biased with respect thereto. For electrostatic focussing, there may be provided a further focussing electrode which is suitably biased and may take the form of a ring or cylinder or a cup. Alternatively, for electromagnetic focussing, further focussing means incorporating a coil may be provided. The electron beam is focussed onto the target, which is of a suitable material, such as tungsten, which will emit X-rays under the electron beam bombardment. It is convenient to use a cylindrical target and the electron beam is focussed at a suitable point on the cylinder such that the X-rays are emitted outwardly at a direction at an angle to the axis of the electron beam. By using a cylindrical target which is made rotatable and slidable about its axis, if a point on the target becomes pitted by the electron beam, the target may be rotated and/or moved axially to bring a fresh portion of the target material into the focus position of the electron beam while still leaving a target surface at the same angle.

In my British Patent Specification No. 1250007 there is described an electron beam equipment having a demountable electrode assembly including a hollow support cylinder adapted to extend inwardly of an equipment envelope to be withdrawable therefrom and to be fastened in vacuum-sealing engagement with the envelope, a detachable cap at the inward end of the cylinder adapted to be fitted to it in vacuum-sealing engagement, various electrode components supported by said cap, at least one of said components being adjustable relatively to the others, actuator means for said adjustable component or components extending through and adjustable relative to the cap and in vacuum-sealing engagement therewith, and adjusting means extending lengthwise within the hollow cylinder and coupled to the actuator means for selective displacement thereof, said adjusting means being disposed parallel to an electric supply cable or to electric supply conductors extending within the cylinder and coupled to the component supported by the cap, means being included for imparting displacement to said adjusting means and to said actuator means. The electrode assembly more particularly comprises an adjustable electron gun having a filament supported on the cap and surrounded by an apertured diaphragm having a small hole or slot therein and at least one focussing cup, the diaphragm and the cup or cups being adjustable by independent adjusting means consisting of rods with independent means for displacing the said rods. Problems with this form of construction arise from the need to prevent any voltage breakdown between the components and more particularly because of the inability to provide adequate orthogonal positioning of the auxiliary focussing means.

SUMMARY OF THE INVENTION

It is one of the objects of the present invention to provide an improved form of construction in which the problems of insulation are substantially ameliorated.

According to the present invention, in X-ray apparatus having an electron beam source comprising a filament mounted on a piston slidable within an insulating cylinder carrying an apertured biasing element in the electron beam path in front of the filament and having a target in the electron beam path beyond said biasing element, the gun and target being sealed within an outer envelope, there is provided an additional electrostatic or electromagnetic focussing means which is separately mounted in said envelope on an insulating support and arranged so that it is adjustable in the direction of the axis of the electron beam between the filament and target and in directions orthogonal thereto.

With this arrangement, the additional focussing means is now completely separated mechanically from the rest of the gun assembly, thereby eliminating any need to take the electrical supply connectors through the gun assembly and so avoiding the insulation problems therein. The additional focussing means can be adjusted not only in the direction of the axis of the electron beam but also in orthogonal directions.

It is convenient, for many purposes, to employ electrostatic focussing and, in this case, the focussing means may comprise an auxiliary electrode requiring only a single electrical supply connection. For focus control, the voltage supply to the focussing electrode may be arranged to supply an adjustable voltage.

In some cases, electromagnetic focussing may be preferred; in this case, the focussing means may comprise a cylindrical electromagnetic. For adjusting the focussing, an adjustable current supply may be provided for the coil. The focussing means may comprise a single electrode or electromagnet or may comprise two or more focussing electrodes or electromagnets on said insulating support, preferably with separately adjustable electrical supplies.

As previously indicated, the filament is preferably a hairpin filament and the target is preferably a cylindrical target. The piston carrying the filament may be adjusted within the aforementioned tube by means of a screw-threaded adjusting device.

The biasing element may be an apertured diaphragm or cone.

Conveniently the insulating support for the focussing means comprises a rod or tube of insulating material extending orthogonally to the axis of the electron beam and slidable in the axial direction of the rod or tube through a vacuum seal in a support member to permit of movement of the focussing means in one direction orthogonal to the axis of the electron beam. The aforesaid support member would generally be of cylindrical form, and the aforesaid insulating rod or tube may extend through the support member. This support member may be adjustably mounted with respect to the envelope for adjustment in two orthogonal directions at right angles to the axis of said rod or tube, the adjusting means being sealed to the aforementioned envelope. By this arrangement, movement in one direction can be effected by sliding the rod or tube in said seal in the support member while movement in orthogonal directions is effected by moving the support member relative to the envelope. It is thus possible to adjust the position of the auxiliary focussing means as required, movement being possible in three orthogonal directions.

The invention furthermore includes within its scope X-ray apparatus comprising a sealed envelope, a target within said envelope, an electron beam source mounted within said envelope and having electrical supply means for generating a beam of electrons for impingement on said target, beam focussing means of annular form and positioned in relation to the electron beam source such that the beam of electrons passes through the annulus, and means connecting an adjustable electrical supply to said beam focussing means, said connecting means including electrical lead means contained within an insulating tube which extends into the envelope and is disposed in spaced relation to the electron beam source. The electron beam source may be connected to its electrical supply means by electrical lead means contained within an insulating tube which extends orthogonally relative to the insulating tube which contains the electrical lead means for the beam focussing means.

DESCRIPTION OF THE PREFERRED EMBODIMENTS

Figure 1:
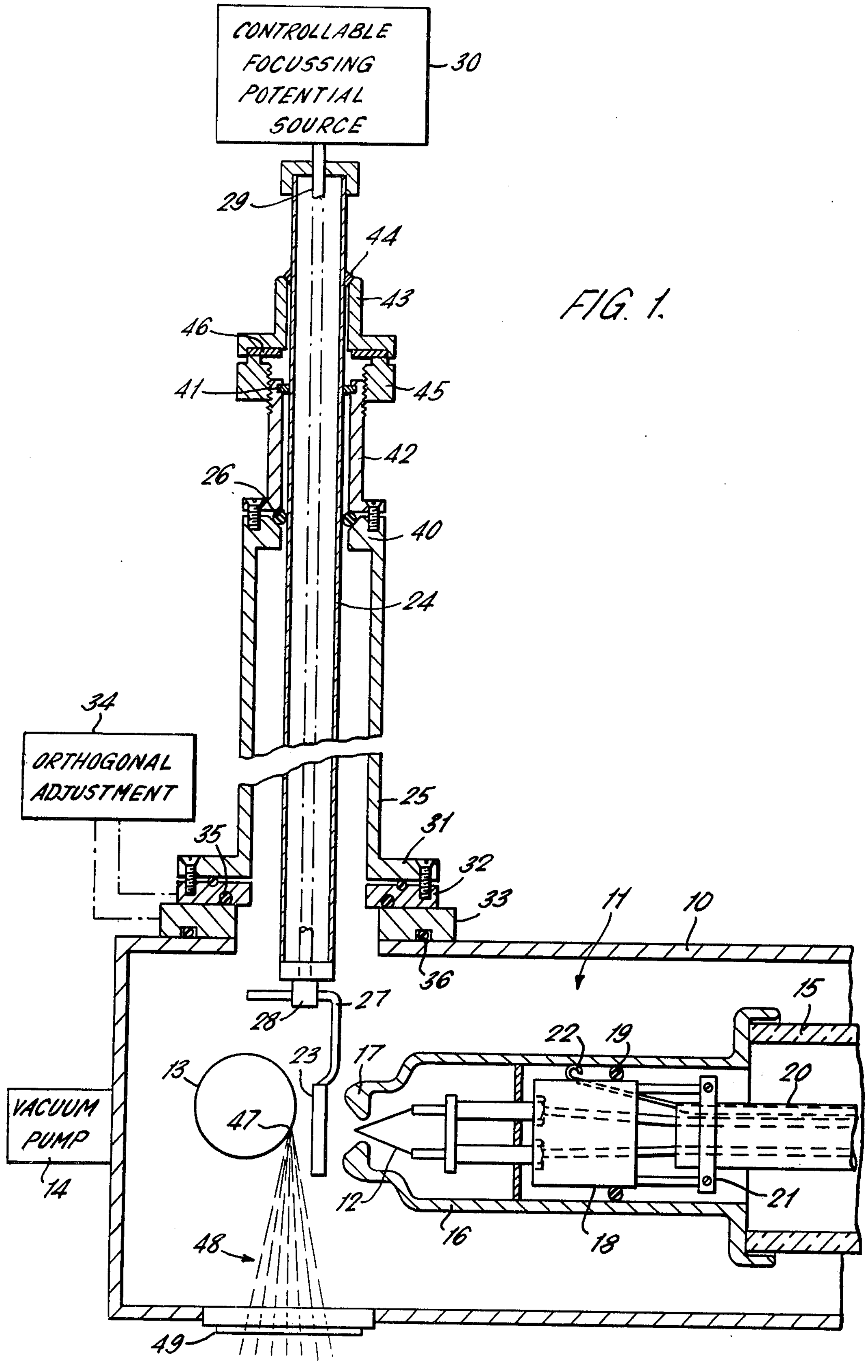
FIG. 1 is a diagrammatic section through part of an X-ray apparatus, showing part of the gun and target assembly and focussing means.

Referring to FIG. 1, there is shown part of an outer envelope 10 of an X-ray apparatus; this may be a metal envelope. Mounted within this envelope, by means not shown, is an electron-emitting gun indicated generally at 11 and having a filament 12 from which the electrons are emitted towards a target 13. This target 13 is shown diagrammatically in FIG. 1 but it may comprise, in the known way, a cylindrical element arranged so that the beam is directed onto the cylindrical surface of the target. The target element may be mounted in the envelope 10 in the known way so as to be adjustable longitudinally of its axis and also rotatable about its axis. The envelope 10 is evacuated in the known way by means of a vacuum pump shown diagrammatically at 14.

The gun assembly comprises a glass support tube 15 carrying a metal gun nose portion 16 which is of generally cylindrical form. This gun nose portion 16 is shaped at its outer end to form an apertured diaphragm or cone 17. This apertured diaphragm 17 or cone 17 is biased with an applied biassing potential to form the initial element of the focussing system. The filament 12 is of hairpin form with its point adjacent to the aperture of the diaphragm or cone 17. The filament 12 is mounted on a piston 18 of insulating material sealed within the gun nose portion 16 by an O-ring seal 19 and is slidable therein. Axial adjustment of the piston 18 can be effected by screw-threaded adjusting means (not shown) operating on a three-core connecting cable 20 which passes through a clamp 21 secured to the aforementioned piston 18. The cable 20 provides two connecting leads for the filament supply and a further lead which is connected to a spring contact 22 engaging the inner wall of the gun nose and enabling the aforementioned bias potential to be applied to the diaphragm 17.

In the arrangement illustrated in FIG. 1 electrostatic focussing means are provided between the gun and the target, these focussing means comprising the aforementioned biased apertured diaphragm or cone 17 and an auxiliary focussing electrode 23. The electrode 23 is a short metal cylinder with its axis aligned with the axis of the electron beam and is mounted on an insulating tube 24 which extends in a direction at right angles to the axis of the electron beam and which passes through an O-ring vacuum seal 26 in a support member 25. The electrode 23 has a metal connecting link 27 which functions both as a mechanical support and as an electrical connection to a terminal 28 on one end of a connecting lead 29 for applying a biasing potential from a controllable bias potential source shown diagrammatically at 30 to the auxiliary focussing electrode 23. This lead 29 passes through the aforementioned tube 24.

The support member 25 has a flange 31 at its end nearer the envelope 10 and is vacuum-sealed to one member 32 of an orthogonal sliding stage. The member 32 is movable with respect to a member 33 in one of two orthogonal directions, both at right angles to the axis of the tube 24, by screw-threaded adjusting means, which may be of known construction, and which are illustrated diagrammatically at 34. These controls move the member 32 with respect to the member 33 and move the member 33 with respect to the tube envelope 10. The member 32 is vacuum-sealed by a seal 35 as well as being slidably connected to the member 33. This latter member is vaccum-sealed by a seal 36 in sliding connection with the envelope 10. The adjustable means 34 thus enable the required positional adjustment of the support member 25 in each of the two orthogonal directions with respect to the tube envelope to be effected.

The end of the support member 25 remote from the tube 10 is also flanged, as shown at 40, and is shaped on its inner surface to accept the aforementioned O-ring seal 26 between the member 25 and the insulating tube 24. To ensure that the tube 24 is held steady, it passes also through a further O-ring 41 in an extension support tube 42 bolted to the flange 40. A collar 43 is cemented at 44 to the insulating tube 24. An internally-threaded ring 45 bears against a washer 46 of anti-friction material, e.g. PTFE, on the collar 43. This ring 45 engages an external thread on the extension support tube 42 which is secured to the flange 40. Rotation of the ring 45 moves the tube 24 towards or away from the envelope 10 thus providing the third orthogonal movement of the auxiliary focussing electrode 23. The threaded ring 45, by bearing against washer 46, provides outward movement of the tube 24. The vacuum in the envelope 10 and support 25 pulls the tube 24 inwards if the ring 45 is moved away from the collar 43.

It will be seen that, with this construction, adjustment of the position of the auxiliary focussing means 23 can readily be effected. The auxiliary focussing electrode 23 is completely separate from the biasing and gun assembly and hence no inter-electrode insulation problems can arise. The electron beam can thus readily be brought to a point focus at 47 on the target 13, thereby providing a divergent beam of X-rays, as indicated at 48, which pass outwardly through a window 49 in the envelope 10.

Figures 2, 3:
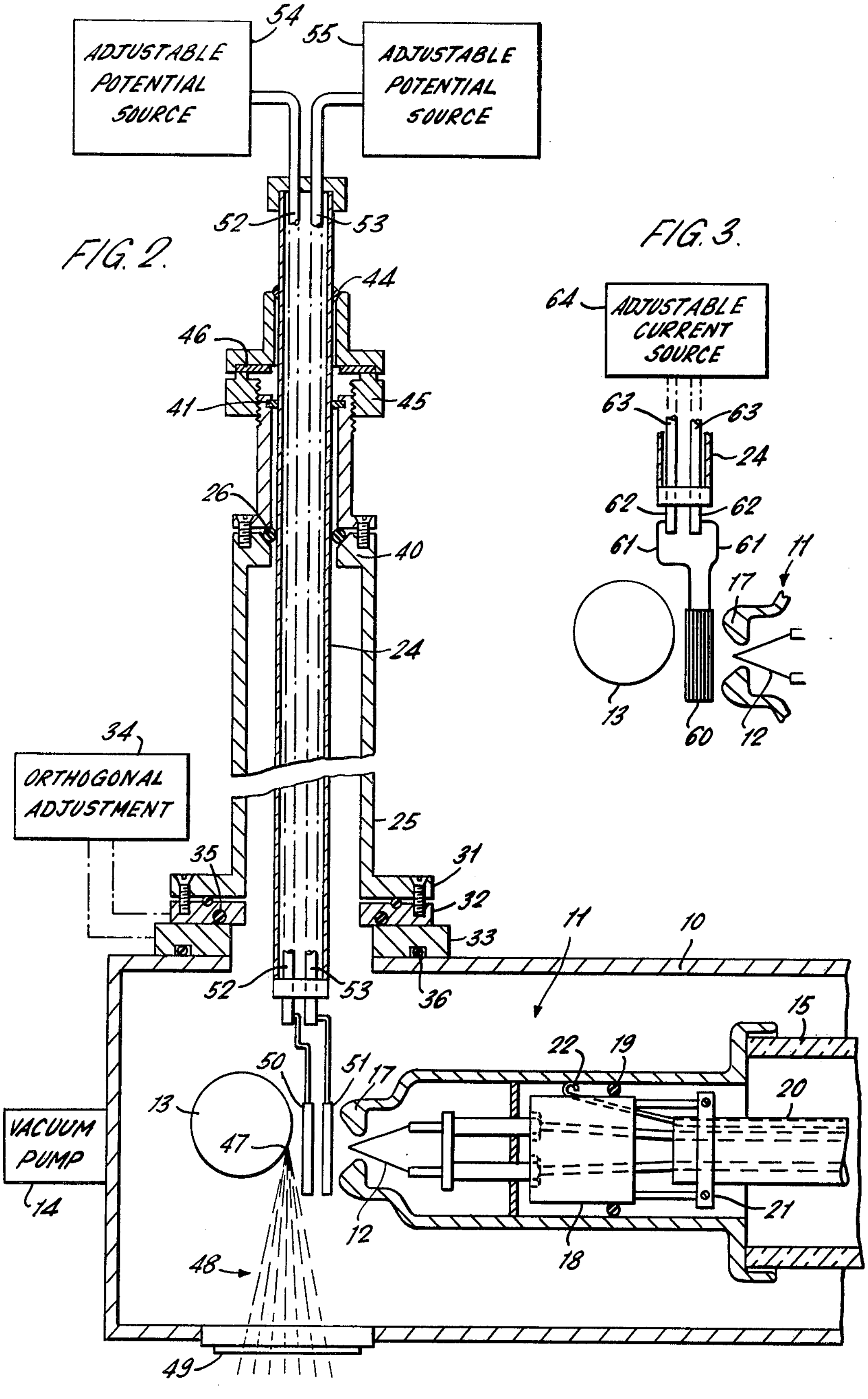
FIG. 2 is a view similar to FIG. 1 illustrating another embodiment of the invention.
FIG. 3 illustrates a modification of part of the apparatus of FIG. 1.

FIG. 2 illustrates a modification of the apparatus of FIG. 1 and, in the following description in which the same rèference characters are used to indicate corresponding components, mentioned will only be made of the distinctive features of FIG. 2. For some purposes, e.g. in X-ray microscopy, the X-ray images are subject to very considerable enlargement. It is essential in such cases that the electron beam must be very sharply focussed to give, as closely as possible, a point source of X-rays. The focussing may be improved by using two separate focussing electrodes 50, 51 between the electron gun 11 and the target 13, these electrodes being connected by wires 52, 53 through the tube 24, to separate adjustable potential sources 54, 55. By separately adjusting the potentials on two successive focussing cylinders along the electron beam path, better focussing can be obtained than with a single focussing electrode. More than two such focussing electrodes could be used if so desired.

In the arrangement of FIG. 2, the two focussing electrodes are mechanically on a common support and hence must move together when their position is adjusted. Alternatively the two focussing electrodes may be separately supported, for example by using two support assemblies, each similar to that of FIG. 1 but arranged in different radial directions with respect to the axis of the electron beam.

Particularly for very high electron beam currents, it may be preferred to employ electro-magnetic focussing rather than electrostatic focussing. Such a construction is illustrated in FIG. 3 which shows part of the gun 11, and the target 13, with a cylindrical focussing electromagnet 60 between them. This coil is connected by leads 61 to terminals 62 on the end of the support tube 24. The tube 24 is adjustable in position as previously described and hence enables the position of the focussing electromagnet 60 to be adjusted. The terminals 62 are connected by leads 63 to an adjustable current source 64 enabling the magnitude of the focussing current to be controlled.

Although only one focussing electromagnet is shown in FIG. 3, two or more such electromagnets may be provided mounted either on a single support tube 24 or mounted on separate independently adjustable supports.

I claim:

1. X-ray apparatus comprising:

an outer envelope, an electron beam source mounted within said envelope and including an insulating cylinder, a piston slidable within said cylinder, a filament mounted on said piston, and an apertured biasing element carried on said cylinder to extend around the electron beam path in front of the filament, a target mounted within said envelope and located in the electron beam path beyond said biasing element, to permit electrons to bombard said target to produce X-rays, means sealing said electron beam source and target within said outer envelope, a support member on said envelope and having a vacuum seal, focussing means including an insulating support in the form of a rod or tube of insulating material extending orthogonally to the axis of the electron beam and slidable in the axial direction of the rod or tube through said vacuum seal to permit movement of the focussing means in one directoion orthogonal to the axis of the electron beam, said insulating support further being adjustable in the direction of the axis of the electron beam between the filament and target and in a direction orthogonal to the axis of the electron beam and to the axial direction of said rod or tube.

2. X-ray apparatus as claimed in claim 1 wherein the further focussing means comprise an auxiliary electrode for electrostatic focussing.

3. X-ray apparatus as claimed in claim 2 and having an adjustable voltage supply for said auxiliary electrode.

4. X-ray apparatus as claimed in claim 1 wherein the further focussing means comprises a cylindrical electromagnetic focussing coil.

5. X-ray apparatus as claimed in claim 4 and having an adjustable current supply for said focussing coil.

6. X-ray apparatus as claimed in claim 1 wherein said support member is of cylindrical form, and the rod or tube extends through the support member.

7. Apparatus as claimed in claim 1 wherein said support member is adjustably mounted with respect to the envelope for adjustment in two orthogonal directions at right angles to the axis of said rod or tube, the adjusting means being sealed to the envelope, whereby the focussing means is adjustable in said orthogonal directions at right angles to the axis of the rod or tube.

8. X-ray apparatus comprising:

an outer envelope, an electron beam source mounted within said envelope and including an insulating cylinder, a piston slidable within said cylinder, a filament mounted on said piston, and an apertured biasing element carried on said cylinder to extend, around the electron beam path in front of the filament, a target mounted within said envelope and located in the electron beam path beyond said biasing element, to permit electrons to bombard said target to produce X-rays, means sealing said electron beam source and target within said outer envelope, focussing means including an insulating support separately mounted in said envelope and at least two focussing electrodes or coils on said insulating support and having separately adjustable electrical supplies, said insulating support being adjustable on the direction of the axis of the electron beam between the filament and target and in directions orthogonal thereto.

* * * * *